P. C. JOHNSON.
AUTOMATIC SIGNALING DEVICE.
APPLICATION FILED APR. 10, 1913.
1,105,793.
Patented Aug. 4, 1914.
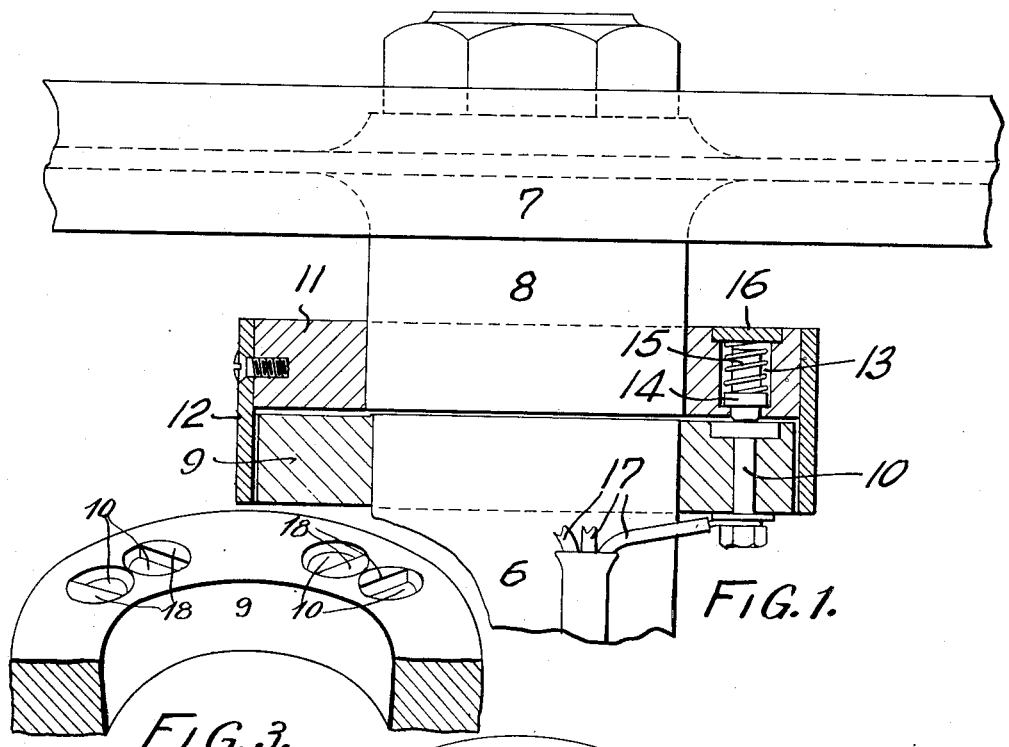
FIG. 1.
FIG. 3.
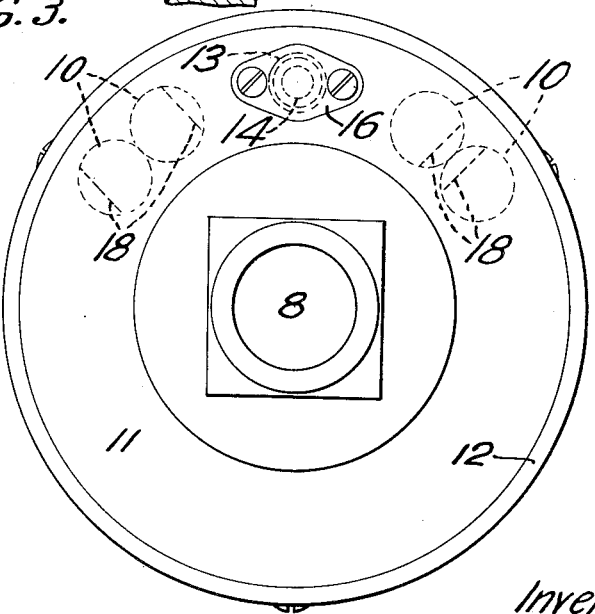
FIG. 2.
Witnesses
Inventor
Peter C. Johnson
By
Fred B. Fetherstonhaugh
His Attorney

UNITED STATES PATENT OFFICE.

PETER C. JOHNSON, OF HALIFAX, NOVA SCOTIA, CANADA.

AUTOMATIC SIGNALING DEVICE.

1,105,793.  Specification of Letters Patent.  Patented Aug. 4, 1914.

Application filed April 10, 1913. Serial No. 760,219.

*To all whom it may concern:*

Be it known that I, PETER C. JOHNSON, of the city of Halifax, in the Province of Nova Scotia and Dominion of Canada, have invented certain new and useful Improvements in Automatic Signaling Devices, of which the following is a full, clear, and exact description.

This invention relates to improvements in automatic horn operating devices for automobiles and the like, and the object is to provide an automatic operating device which will actuate the horn or other signal when the automobile turns from a straight course.

A further object is to provide an automatic warning device arranged to give different signals to indicate whether the vehicle is turning to right or left.

To accomplish these objects, I provide in combination with an electric horn an additional operating circuit having a circuit maker arranged to be operated by some part of the steering apparatus, preferably the steering wheel. The circuit maker is preferably provided with contacts so arranged that clearly distinguishable signals will be given to indicate whether the vehicle is turning to right or left.

In the drawings which illustrate the invention:—

Figure 1 is a sectional view of the device in position on the steering column of an automobile. Fig. 2 is a plan view of the device. Fig. 3, is a perspective view of a portion of the insulating collar showing the contacts in place.

Referring more particularly to the drawings, 6 designates the casing of the steering column of a power driven vehicle, and 7 the steering wheel having a hub 8.

The particular type of circuit maker for the horn which forms the subject of this invention is preferably mounted part on the steering column and part on the steering wheel hub, as is shown in the drawings. It will, however, be obvious that without in any way departing from the spirit of the invention, the circuit maker may be mounted on any suitable part of the vehicle, and arranged with one member revoluble and connected with a suitable portion of the steering apparatus. This circuit maker in the arrangement shown in the drawings consists of a collar 9 of insulating material rigidly mounted at the top of the steering column case 6, and provided with a plurality of contacts 10 arranged in spaced groups, as clearly shown in Fig. 2. A collar 11 preferably of metal is mounted on the hub 8 of the steering wheel, and is provided with a dust ring 12 surrounding the collar 9. The collar 11 is apertured at 13 for the reception of a circuit making plunger 14, which is pressed downwardly by a spring 15 held in compression between the plunger and cover 16 of the aperture. Wires 17 are connected to one end of the horn circuit, while the other end thereof is grounded on the steering column.

The contacts 10, it will be noted, are placed equidistant from the axis of the steering column. The plunger 14 is also placed the same distance out so that when the steering wheel is turned, the plunger will pass over the contacts. The collar 11 is arranged in such relation to the steering wheel that when the wheel is set to steer the vehicle straight ahead, the plunger 14 will be midway between the groups of contacts, as clearly shown in Fig. 2. Thus, when the wheel is turned to steer the vehicle to the right, the plunger 14 makes electrical connection with the right hand group and vice versa. The contact groups are placed as close together as possible, so that any appreciable degree of turning in either direction will automatically sound the horn. Preferably, the distance between these contact groups is only sufficient to allow for the movement of the steering wheel imparted by the vehicle wheels traveling on a rough road.

It is preferred to arrange the contacts so that distinguishing signals will be given to indicate the direction in which the car is turning. This result may be achieved in a number of ways. The arrangement shown in the drawings is probably the most simple and permits of adjustment according to the user's inclination. In this arrangement, the contacts 10 are circular and arranged in abutting relation. Each contact is, however, flattened as indicated at 18. If the contacts are turned, as shown in the left hand group, with the flats separated, the horn will give two short blasts. If, however, the contacts are turned with the flats adjacent as in the right hand group, the horn will give one long blast each time the plunger 14 is carried over the contacts by the movement of the steering wheel.

Having thus described my invention, what I claim is:—

1. A device of the character described comprising the combination with the steering column, steering wheel and signal circuit of a vehicle, said signal circuit having one side thereof grounded on the steering wheel, of an insulating collar fixed to the steering column, a collar fixed to the steering wheel, a plurality of contacts arranged in two groups in the insulating collar, a spring pressed plunger in the second collar electrically connected with the steering wheel, and electrical connections between said contacts and the opposite side of the signal circuit.

2. An automatic signal operating device comprising the combination with a vehicle and a signal circuit of a signal circuit terminal mounted in fixed relation with a movable part of the vehicle steering apparatus, a second signal circuit terminal rigidly mounted in the path of the first terminal, said second terminal being divided into two pairs of circular parts arranged on opposite sides of the normal position of the first terminal each of said circular parts having a flattened portion, the flattened portions of one pair being adjacent each other and the flattened portion of the other pair being arranged with the flattened portions remote from each other.

3. A device of the character described comprising the combination with the steering column, steering wheel and signal circuit of a vehicle, said signal circuit having one side thereof grounded on the steering wheel, of an insulating collar fixed to the steering column, a collar fixed to the steering wheel, a ring fixed to said last named collar and receiving the first mentioned collar, a plurality of contacts arranged in two groups in the insulating collar, a spring pressed plunger in the second collar electrically connected with the steering wheel, and electrical connections between said contacts and the opposite side of the signal circuit, and means for varying the length of said contacts.

4. A device of the character described comprising the combination with the steering column, steering wheel and signal circuit of a vehicle, said signal circuit having one side thereof grounded on the steering wheel, of an insulating collar fixed to the steering column, a collar fixed to the steering wheel, a plurality of contacts arranged in two groups in the insulating collar, a contact in the second collar electrically connected with the steering wheel, electrical connections between said contacts and the opposite side of the signal circuit, and means whereby the contacts close the circuits for periods of time, differing as to length and frequency, according to the direction in which the wheel is turned.

In witness whereof I have hereunto set my hand in the presence of two witnesses.

PETER C. JOHNSON.

Witnesses:
 ALFRED R. CALDWELL,
 EUGENE M. LAMB.